(12) United States Patent
Bookheimer

(10) Patent No.: US 12,551,953 B2
(45) Date of Patent: Feb. 17, 2026

(54) MODULAR DRILL WITH CAM CLAMPING

(71) Applicant: Kennametal Inc., Latrobe, PA (US)

(72) Inventor: Alan J. Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 577 days.

(21) Appl. No.: 17/979,686

(22) Filed: Nov. 2, 2022

(65) Prior Publication Data

US 2024/0139833 A1    May 2, 2024

(51) Int. Cl.
*B23B 51/00*    (2006.01)

(52) U.S. Cl.
CPC ...... *B23B 51/0003* (2022.01); *B23B 51/0005* (2022.01); *B23B 2260/02* (2013.01); *Y10T 408/90987* (2015.01)

(58) Field of Classification Search
CPC ............ B23B 51/0003; B23B 51/0005; B23B 2260/02; Y10T 408/9098; Y10T 408/90987
See application file for complete search history.

(56) References Cited

U.S. PATENT DOCUMENTS

| | | | |
|---|---|---|---|
| 2,511,884 A * | 6/1950 | Thomas | B23B 29/03428 279/6 |
| 4,729,702 A * | 3/1988 | Kelm | B23B 31/1076 409/234 |
| 4,976,574 A | 12/1990 | Muendlein et al. | |
| 6,012,881 A | 1/2000 | Scheer | |
| 9,669,470 B2 * | 6/2017 | Matlik | B23B 31/265 |
| 2002/0139587 A1 | 10/2002 | Mast et al. | |
| 2006/0140736 A1 | 6/2006 | Kress et al. | |
| 2010/0322723 A1 | 12/2010 | Danielsson | |
| 2011/0110739 A1 | 5/2011 | Frisendahl | |
| 2011/0236145 A1 | 9/2011 | Päbel et al. | |
| 2014/0154023 A1 | 6/2014 | Craig | |
| 2015/0360300 A1 | 12/2015 | Hecht | |

(Continued)

FOREIGN PATENT DOCUMENTS

| | | | | |
|---|---|---|---|---|
| CN | 87106927 A | * | 4/1988 | ........ B23B 31/1076 |
| CN | 109365844 A | | 2/2019 | |

(Continued)

OTHER PUBLICATIONS

Jan. 13, 2025 Non-Final Office Action U.S. Appl. No. 17/979,626, 09 Pages.

(Continued)

*Primary Examiner* — Eric A. Gates
(74) *Attorney, Agent, or Firm* — Christopher J. Owens

(57) ABSTRACT

A modular drill is disclosed. The modular drill includes a tool shank extending along a rotational axis. The tool shank includes a shank top end and a shank bottom end along a rotational axis and includes a cam slot extending at least partially through a width of the tool shank. The modular drill includes a cutting head extending from a cutting head top surface to a cutting head bottom surface centered on the rotational axis. The cutting head includes a draw pin extending from the bottom surface of the cutting head along the rotational axis and a draw pin notch. The modular drill includes a clamping cam including a cam shaft contacting the draw pin notch.

14 Claims, 12 Drawing Sheets

(56) References Cited

U.S. PATENT DOCUMENTS

2016/0195119 A1\* 7/2016 Bookheimer ........... F16B 19/02
                                                                                                          403/376
2019/0126361 A1   5/2019 Hecht et al.
2022/0118526 A1\* 4/2022 Gey ................... B23B 51/0003

FOREIGN PATENT DOCUMENTS

KR       20140056226 A  \*  5/2014  .......... B23B 29/046
WO    WO-2013073690 A1 \*  5/2013  ......... B23B 27/1662

OTHER PUBLICATIONS

May 28, 2025 Non Final Rejection U.S. Appl. No. 17/979,626, 10 Pages.

\* cited by examiner

MODULAR DRILL WITH CAM CLAMPING

FIELD OF THE INVENTION

The present invention relates to modular drills, and more particularly a clamping cam for securing a cutting head in a drill body of a modular drill.

BACKGROUND INFORMATION

Modular drills are used in a variety of applications. The modular drills often include a cutting head secured to a tool holder assembly. After wear, it is often desired to replace the cutting head of the modular drills. However, this often requires a significant amount of effort and time. The tool holder itself may need to be removed prior to the removal of the cutting head. The use of a cam for clamping may allow for a decrease in changeout time of the cutting head while still allowing for a secure hold of the cutting head during operation.

SUMMARY OF THE INVENTION

The present invention provides a modular drill. A modular drill is disclosed. The modular drill includes a tool shank extending along a rotational axis. The tool shank includes a shank top end and a shank bottom end along a rotational axis and includes a cam slot extending at least partially through a width of the tool shank. The modular drill includes a cutting head extending from a cutting head top surface to a cutting head bottom surface centered on the rotational axis. The cutting head includes a draw pin extending from the bottom surface of the cutting head along the rotational axis and a draw pin notch. The modular drill includes a clamping cam including a cam shaft contacting the draw pin notch.

An aspect of the present invention is to provide a cutting head for a modular drill including a cutting head top surface opposite a cutting head bottom surface centered along a rotational axis. The cutting head also includes a draw pin extending from the cutting head bottom surface along the rotational axis and structured and arranged to be releasable secured to a tool shank. A draw pin notch extends at least a partial length through the width of the draw pin and is structured and arranged to engage a clamping cam.

A further aspect of the present invention is to provide a clamping cam for a modular drill. The clamping cam includes a front end extending along a cam central axis from a front end outer wall to a front end inner wall, a rear end opposite the front end extending along the cam central axis from a rear end inner wall to a rear end outer wall and a cam shaft connecting the front end inner wall to the rear end inner wall. The cam shaft extends from the front end inner wall to the rear end inner wall along a shaft axis.

A further aspect of the present invention is to provide a tool shank for a modular drill, the tool shank having a rotational axis and including a shank top end, a shank bottom end, a draw pin slot structured and arranged to receive a draw pin of a cutting head and aligned with the rotational axis, and a cam slot structured and arranged to receive a clamping cam. The clam slot defines a central axis offset from the rotational axis.

These and other aspects of the present invention will be more apparent from the following description.

DETAILED DESCRIPTION

Figure 1:
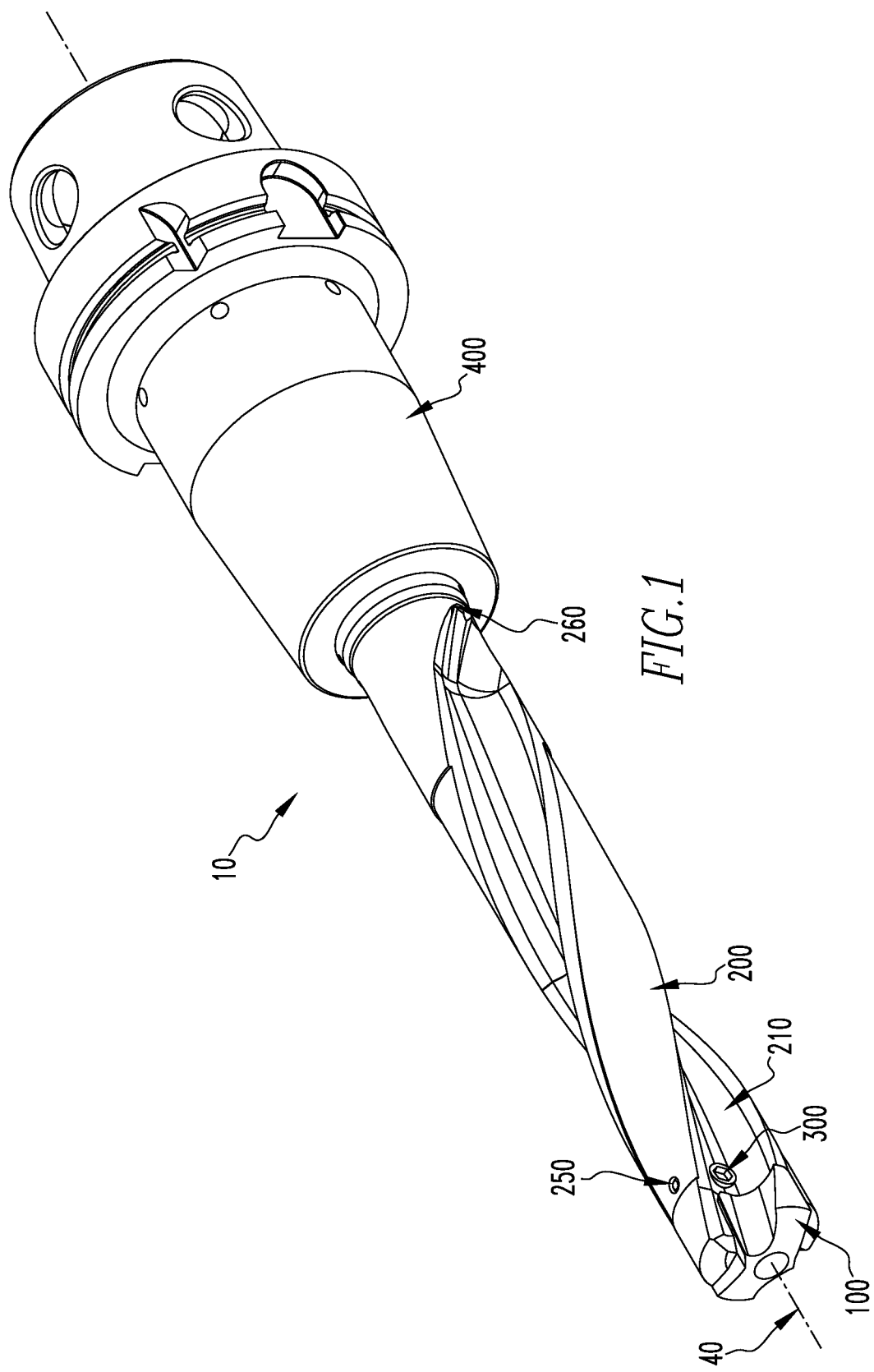
FIG. 1 is an isometric view of a modular drill assembled into a toolholder in accordance with an embodiment of the present invention.

The modular drill of the present invention addresses the issues mentioned above by providing a clamping cam that can lock a cutting head in place. The clamping cam can receive a draw pin of a cutting head. Rotation of the clamping cam can cause a cam shaft to come in contact with the draw pin and hold the draw pin in place.

The clamping cam provides several benefits to modular drills. The clamping cam can be rotated from the side of the modular drill, allowing the cutting head of the modular drill to be installed and discharged while the tool shank remains installed. This may decrease time necessary to replace the cutting heads. It also may increase worker safety by providing a simpler method of replacing cutting heads. Other benefits may be experienced.

Referring to FIGS. 1-4, a modular drill 10 is shown including a cutting head 100 releasably secured to a tool shank 200 by a clamping cam 300. The tool shank 200 may be structured and arranged to be secured into a tool holder 400.

Figure 4:
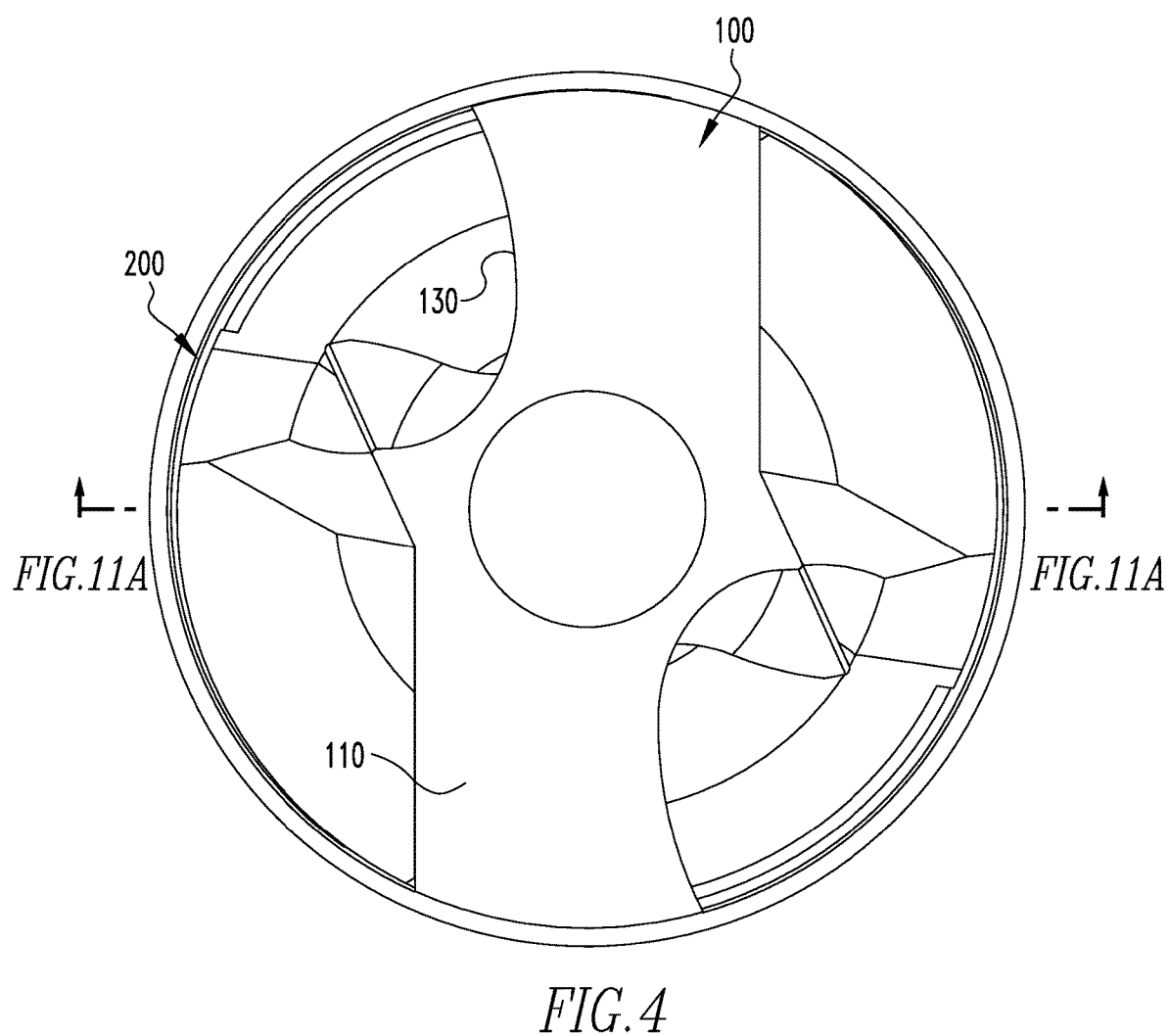
FIG. 4 is a top view of the modular drill of FIG. 1.

The cutting head 100, as shown in FIGS. 1 and 4, may extend along a central longitudinal rotational axis 40 from a cutting head top surface 110 to a cutting head bottom surface 120. The cutting head 100 may be structured and arranged to rotate clockwise or counterclockwise around the rotational axis 40. The cutting head 100 may include one or more cutting edges 130 extending radially outward along the cutting head top surface 110.

Figure 9:
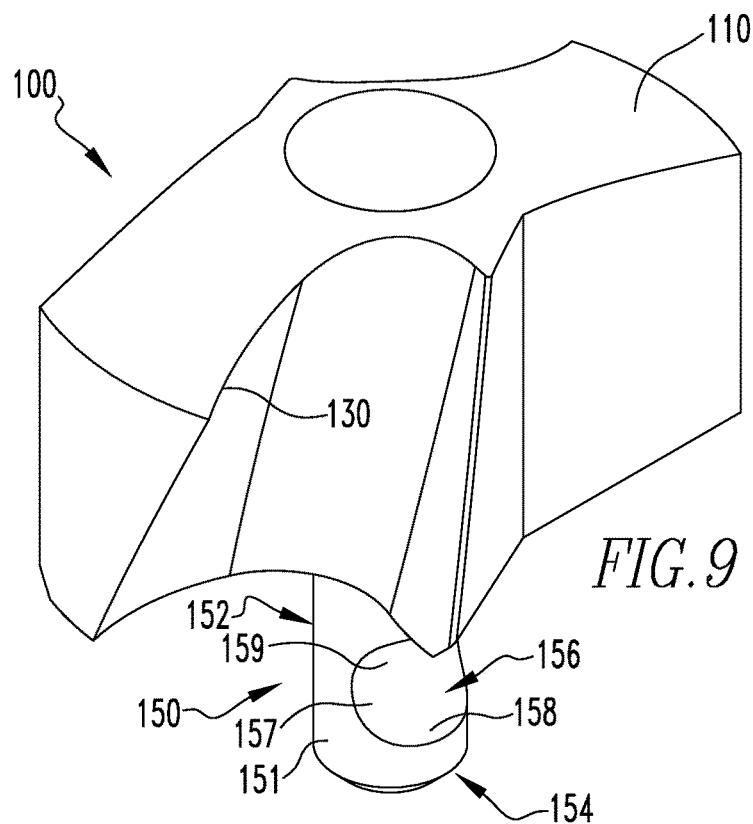
FIG. 9 is an isometric view of a cutting head in accordance with an embodiment of the present invention.
Figure 10:
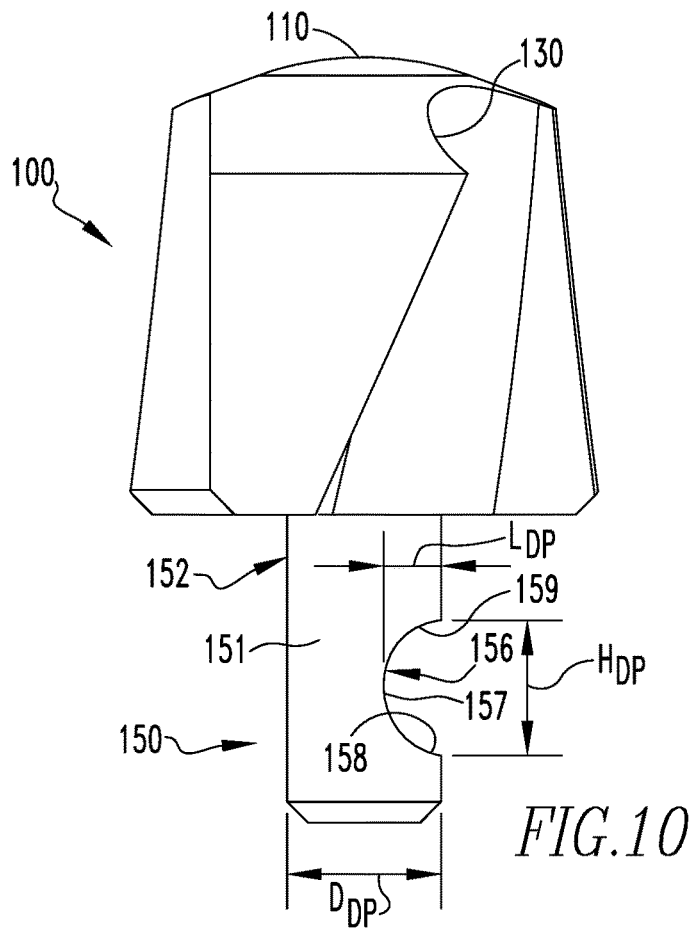
FIG. 10 is a side view of the cutting head of FIG. 9.

As shown in FIGS. 9 and 10, the cutting head 100 may include a draw pin 150 secured to the cutting head bottom surface 120 of the cutting head 100. The draw pin 150 may be releasably secured to the cutting head 100 or permanently secured to the cutting head 100. The draw pin 150 may include a draw pin first end 152 opposite a draw pin second end 154. The draw pin 150 may be cylindrical in shape. The draw pin 150 may be secured to the center of the cutting head bottom surface 120. The draw pin 150 may extend perpendicularly from the cutting head bottom surface 120 and may extend along the rotational axis 40.

The draw pin first end 152 may be secured to the cutting head 100 by a threaded connection, a clip connection, a weld and/or the like. The draw pin first end 152 may include a threaded connection around the draw pin outer surface 151 of the draw pin first end 152 structured and arranged to connect to the cutting head 100. The draw pin 150 may be structurally integrated into the cutting head 100 such that the draw pin 150 and cutting head 100 form a single solid component.

The draw pin 150 may include a draw pin notch 156. The draw pin notch 156 may be structured and arranged to receive a cam shaft 380 of a clamping cam 300 (shown in FIG. 5). The draw pin notch 156 may be a concave surface. The draw pin notch 156 may extend from the draw pin outer surface 151 toward the center of the draw pin 150 at a distance of the draw pin notch length $L_{DP}$. The concave surface may be circular or ovaloid in shape. The draw pin notch 156 may extend through the width of the draw pin 150 along a plane perpendicular to the rotational axis 40. The draw pin notch 156 may have a draw pin notch height $H_{DP}$, measured as the height of the draw pin notch 156 along the draw pin outer surface 151 parallel to the rotational axis 40. The draw pin notch 156 may be continuously curved and may not contain any flat surfaces.

The draw pin notch 156 may include a clamping cam follower contact surface 158 and a discharging cam follower contact surface 159. The clamping cam follower contact surface 158 may be opposite the discharging cam follower contact surface 159. The clamping cam follower contact surface 158 may be a curved surface and may be structured and arranged to make contact with a cam shaft 380 of a clamping cam 300 (shown in FIG. 5) as the clamping cam 300 is moved to a clamped position. The clamping cam follower contact surface 158 may be located on the portion of the draw pin notch 156 closest to the draw pin second end 154.

The discharging cam follower contact surface 159 may be a curved surface and may be structured and arranged to make contact with the cam shaft 380 of the clamping cam 300 as the clamping cam 300 is moved to a discharge position. The discharging cam follower contact surface 159 may be located on the portion of the draw pin notch 156 closest to the draw pin first end 152. The discharging cam follower contact surface 159 may have a radius of curvature which is the same or different than the radius of curvature of the clamping cam follower contact surface 158.

The discharging cam follower contact surface 159 and the clamping cam follower contact surface 158 may be connected by an intermediate surface 157. The intermediate surface 157 may be a curved surface. In non-limiting embodiments, the draw pin notch 156 may be continuously curved from the clamping cam follower contact surface 158 through the intermediate surface 157 and the discharging cam follower contact surface 159. The radius of curvature of the intermediate surface 157 may be the same or different than the radii of curvature of the discharging cam follower contact surface 159 and the clamping cam follower contact surface 158. The intermediate surface 157, discharging cam follower contact surface 159 and the clamping cam follower contact surface 158 may have a partial cylindrical shape.

In a non-limiting embodiment, the intermediate surface 157 may act as cam follower contact surface and engage with the cam shaft 380 of the clamping cam 300 as the draw pin 150 of the cutting head 100 is drawn into the draw pin slot 220 of the tool shank (see FIG. 4) into the clamped position and as the draw pin 150 is ejected from the clamping position to the discharge position. Alternatively, the intermediate surface 157 may not form a contact surface for engagement with the cam shaft 380, e.g., when the draw pin 150 moves between a clamped position and a discharge position, the intermediate surface 157 may not engage the cam shaft 380 or any other mechanical fastener used for fastening the draw pin 150 into the draw pin slot 220.

Figures 2A, 2B:
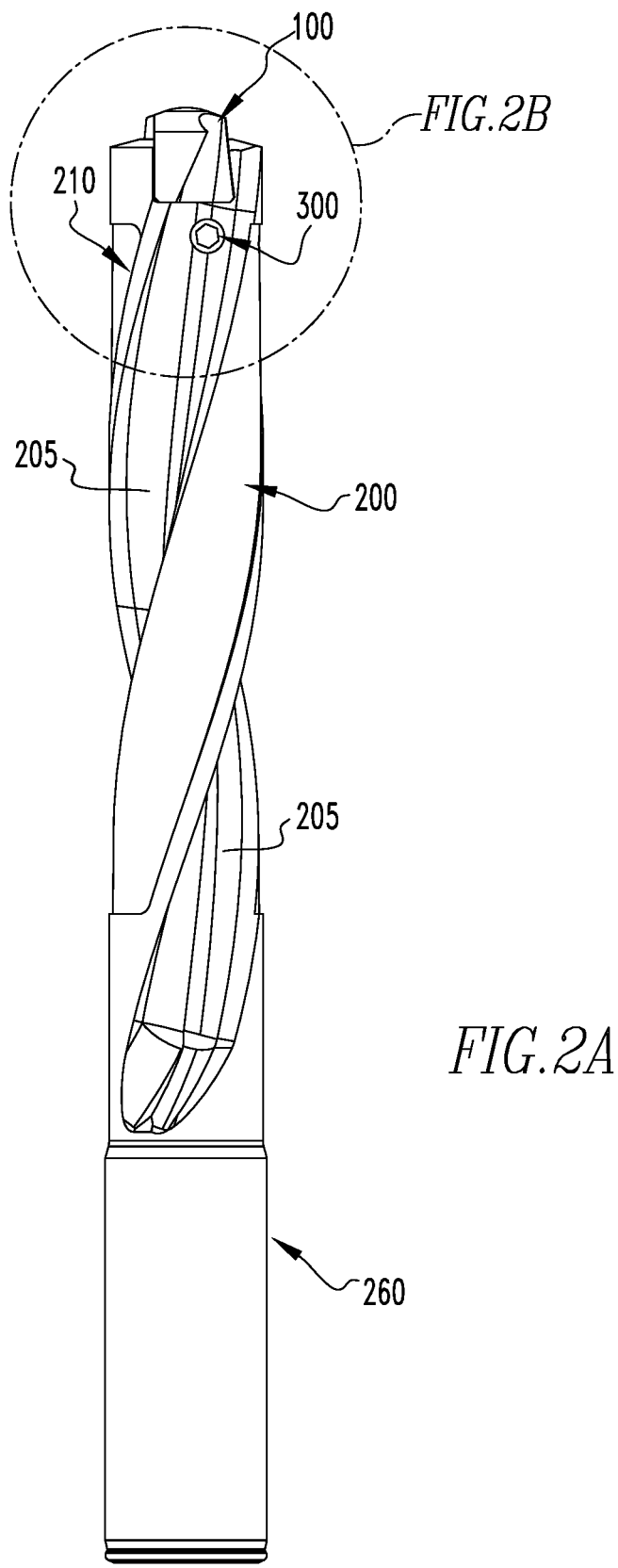
FIGS. 2A and 2B are side views of the modular drill of FIG. 1.
Figure 2B:
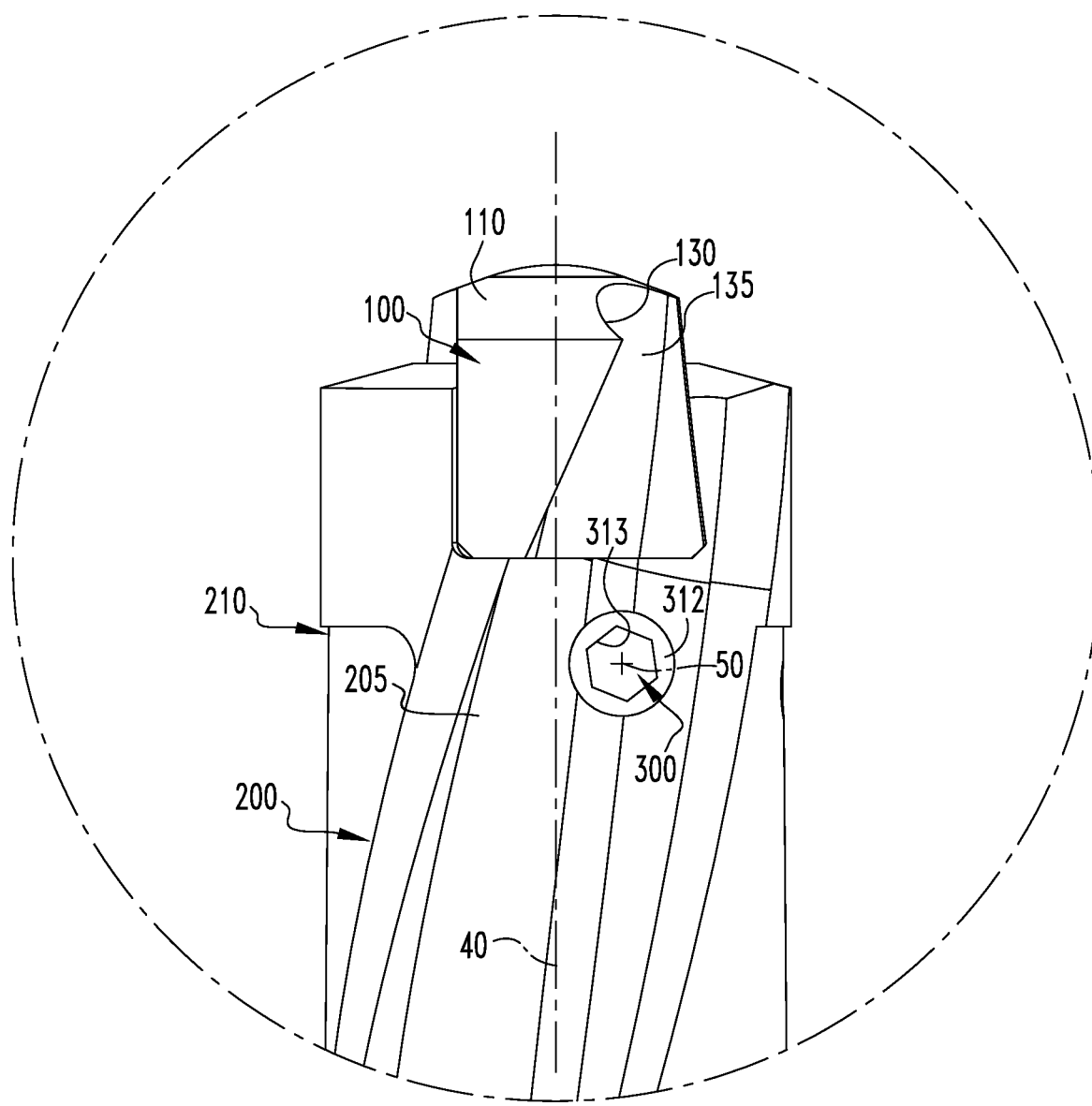
Figure 3:
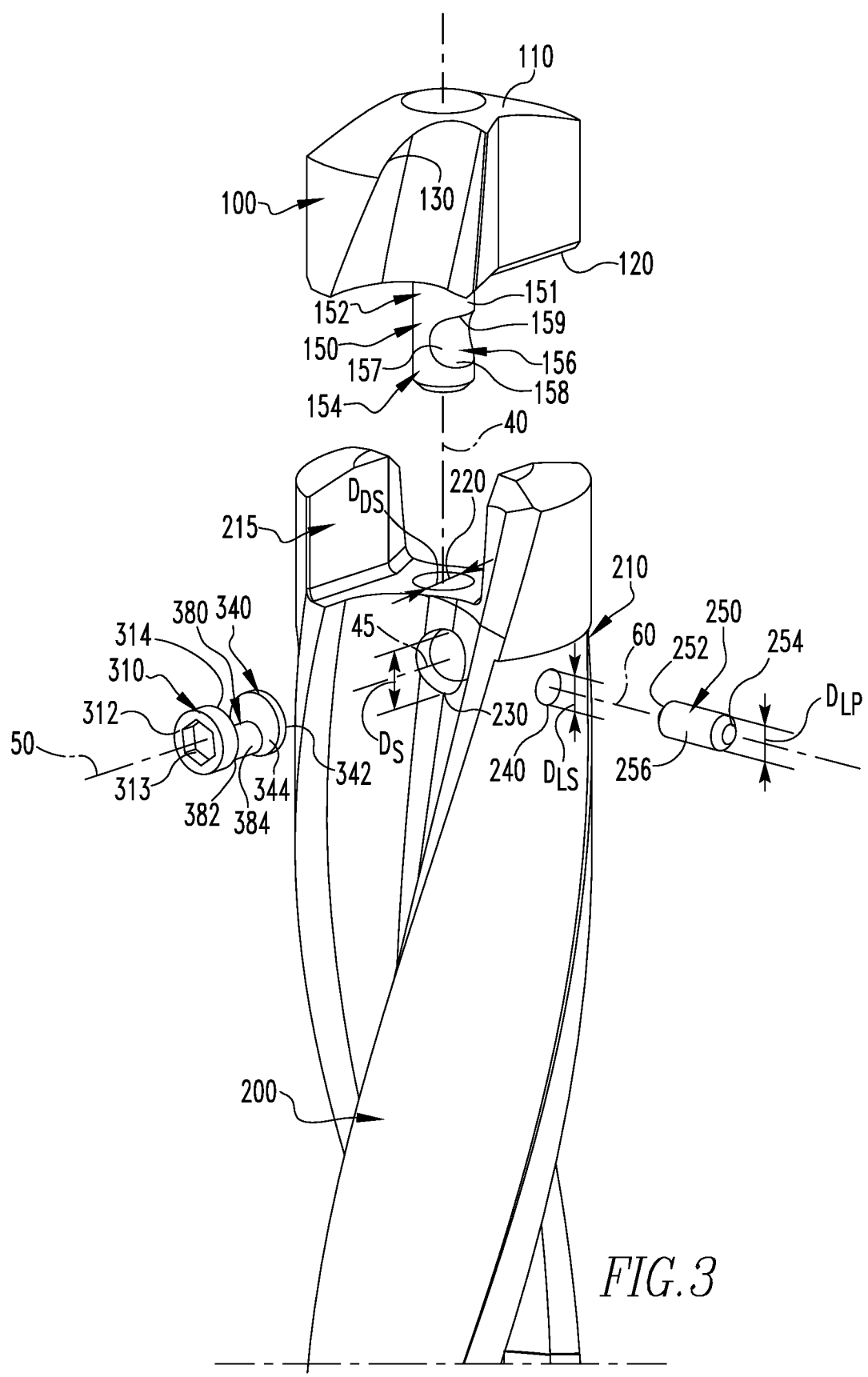
FIG. 3 is an exploded view of the modular drill of FIG. 1.

As shown in FIGS. 2A, 2B and 4, the tool shank 200 may extend along the rotational axis 40 from a shank top end 210 to a shank bottom end 260. The tool shank 200 may be cylindrical in shape. The tool shank 200 may include at least one helical flute 205. The tool shank 200 may include two opposing helical flutes 205. The helical flute 205 may be generally aligned with the cutting head flute 135 of the cutting head 100. The tool shank 200 may include a cutting head slot 215 proximate to the shank top end 210, the cutting head slot 215 being structured and arranged to receive the cutting head 100. The cutting head slot 215 may be the same width, or about the same width, as the cutting head 100 such that insertion of the cutting head 100 into the cutting head slot 215 results in an interference fit or a friction fit of the cutting head 100. The cutting head slot 215 may extend from the shank top end 210 toward the shank bottom end 260 and may extend parallel to the rotational axis 40.

The tool shank 200 may include a draw pin slot 220 proximate the shank top end 210, the draw pin slot 220 being structured and arranged to receive the draw pin 150 of the cutting head 100. The draw pin slot 220 may be cylindrical in shape or substantially cylindrical in shape and may have a draw pin slot diameter DDS that is equal to or roughly equal to the draw pin diameter DSP such that insertion of the draw pin 150 into the draw pin slot 220 results in a clearance fit of the draw pin 150. The draw pin slot 220 may extend from the cutting head slot 215 toward the shank bottom end 260 along the rotational axis 40. A central axis of the draw pin slot 220 may align with the rotational axis 40 such that the central axis of the draw pin slot 220 is in the same location as the rotational axis 40. The draw pin slot 220 may extend between the opposing helical flutes 205.

As shown in FIGS. 2A and 2B, the tool shank 200 may include a cam slot 230 proximate the shank top end 210. The cam slot 230 may be structured and arranged to receive the clamping cam 300. The cam slot 230 may extend through the entire width of the tool shank 200 or may extend through a partial length of the tool shank 200 along a central axis 45. The cam slot 230 may extend through the opposing helical flutes 205. The central axis 45 may be perpendicular with the rotational axis 40. The central axis 45 may be offset from the rotational axis 40 such that the central axis 45 and the rotational axis 40 do not intersect (see FIG. 2B). The depth of the cam slot 230 may be equal to or greater than the length of the clamping cam 300. The draw pin slot 220 may intersect the cam slot 230. The draw pin slot 220 may intersect the cam slot 230 at a distance equal to the draw pin notch length $L_{DP}$.

The cam slot 230 may be cylindrical in shape. The cam slot 230 may have a cam slot diameter $D_S$ of at least 2 mm, for example, at least 4 mm or at least 8 mm. The cam slot diameter $D_S$ may be at most 16 mm, for example, at most 13 mm or at most 10 mm. The cam slot diameter $D_S$ may range from 2 mm to 16 mm, for example, from 4 mm to 13 mm, or from 8 mm to 10 mm. The cam slot diameter $D_S$ may be longer than the draw pin notch height $H_{DP}$.

The tool shank 200 may include a locking slot 240. The locking slot 240 may be perpendicular to the cam slot 230. The locking slot 240 may intersect with the cam slot 230. The locking slot 240 may extend radially inward from the outer surface of the tool shank 200 to the cam slot 230 along a locking axis 60. The locking axis 60 may be structured and arranged such that a plane normal to the central axis 45 and a plane normal to the locking axis 60 are perpendicular to each other. The locking axis 60 may also be structured and arranged such that a plane normal to the rotational axis 40 and a plane normal to the locking axis 60 are perpendicular to each other. The locking axis 60 may be offset from the central axis 45 along the rotational axis 40 such that the central axis 45 and the locking axis 60 do not intersect.

The locking slot 240 may be cylindrical in shape. The locking slot 240 may be structured and arranged to receive a locking pin 250. The locking slot 240 may have a locking slot diameter $D_{LS}$ that is less than the cam slot diameter $D_S$.

The locking pin 250 may be cylindrical in shape. The locking pin 250 may extend from a locking pin front surface 252 to a locking pin rear surface 254. The locking pin front surface 252 and/or the locking pin rear surface 254 may be flat, concave or convex in shape. The locking pin front surface 252 and/or the locking pin rear surface 254 may include beveled, chamfered or curved edges around the outside diameter of the locking pin 250. The locking pin outside surface 256 may have a locking pin diameter DLP that is equal to or less than the locking slot diameter $D_{LS}$. The locking pin 250 may extend at least partially into the cam slot 230 when inserted in the locking slot 240. The locking pin 250 may be secured in the locking slot 240 by a threaded connection, friction fit and/or the like. The locking pin 250 may be releasably secured or permanently secured to the tool shank 200. The locking pin 250 may be an integral part of the tool shank 200 or a separate component of the tool shank 200.

The locking slot 240 may include a pin stop 245. The pin stop 245 may prevent the locking pin 250 from extending any farther radially into the locking slot 240. The pin stop 245 may be a slanted surface, curved surface, straight surface and/or the like. The pin stop 245 may be structured and arranged to contact the locking pin front surface 252. The pin stop 245 may intersect the cam slot 230. The pin stop 245 may be formed by the intersection of the cam slot 230 with the locking slot 240.

As shown in FIGS. 5-8, the clamping cam 300 extends from a front end 310 to a rear end 340. The front end 310 may be connected to the rear end 340 by a cam shaft 380. The front end 310 and/or the rear end 340 may be cylindrical in shape.

Figure 6:
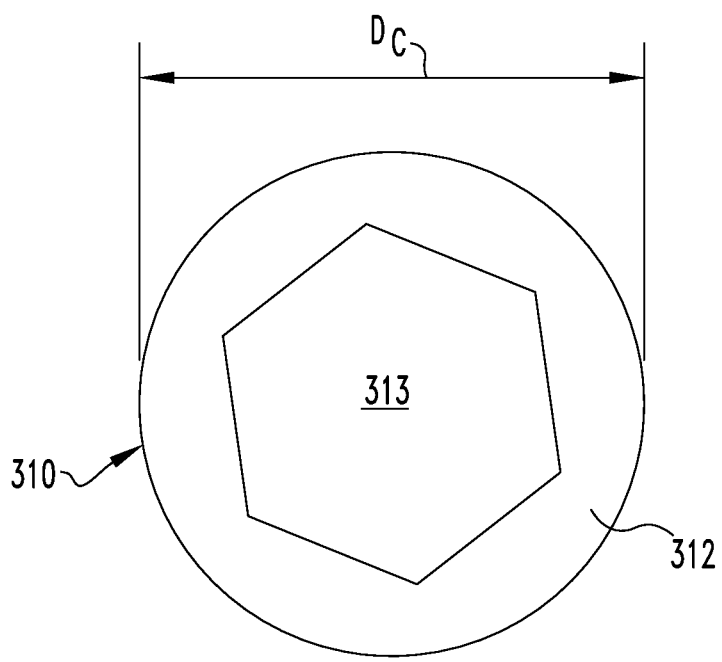
FIG. 6 is a front view of the cam of FIG. 5.

As shown in FIG. 6, the clamping cam 300 may have a cam outer diameter $D_C$. The cam outer diameter $D_C$ may be less than, equal to or approximately equal to the cam slot diameter $D_S$. The clamping cam 300 may be inserted into the cam slot 230, and may be structured and arranged to rotate with the cam slot 230. The cam outer diameter $D_C$ may be equal to the outer diameter of the front end 310 and the outer diameter of the rear end 340.

Figure 5:
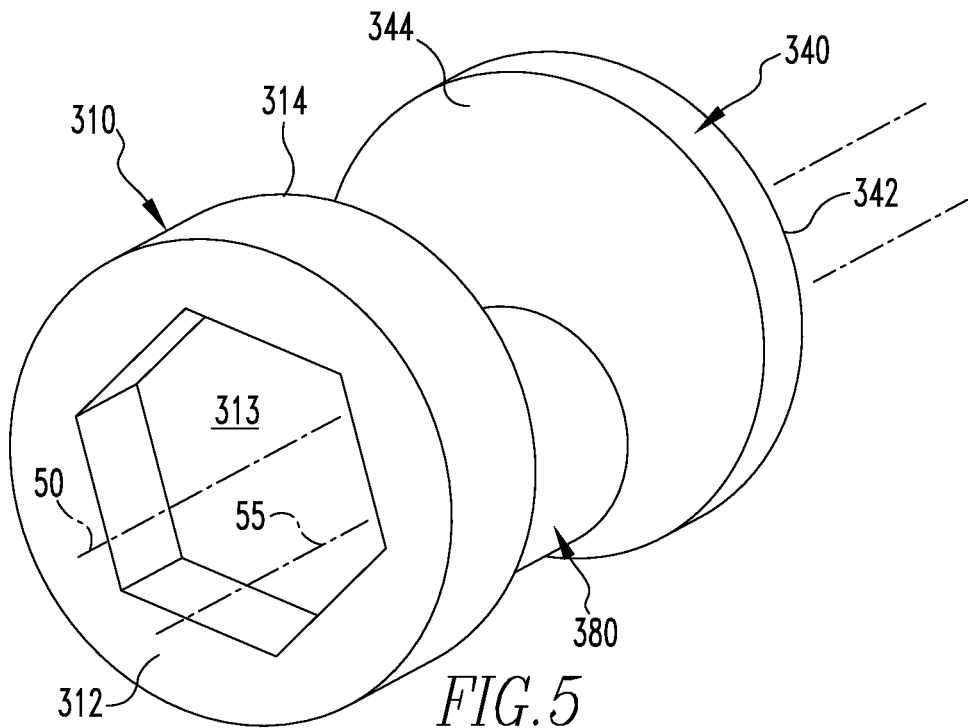
FIG. 5 is an isometric view of a cam in accordance with an embodiment of the present invention.

As shown in FIG. 5, the front end 310 may extend from a front end outer wall 312 to a front end inner wall 314 along a cam central axis 50. When installed in a cam slot 230 of a tool shank 200, the cam central axis 50 may align with the central axis 45. The front end outer wall 312 and/or the front end inner wall 314 may include beveled, chamfered or curved edges around the outside diameter of the front end 310.

As shown in FIGS. 5 and 6, the front end 310 may include a front recess 313 extending from the front end outer wall 312 toward the front end inner wall 314. The front recess 313 may be structured and arranged to receive a rotation tool (not shown) such as an allen wrench, flat head screwdriver, Phillips head screwdriver or the like that applies a force on the front end 310, resulting in a rotation of the front end 310 and the full body of the clamping cam 300. The front end 310 may be rotated about the cam central axis 50. The front recess 313 may be hex shaped, cross shaped, square shaped, star shaped, triangular shaped, line shaped and/or the like. In some non-limiting embodiments or aspects, the front end outer wall 312 may be flat, convex shaped or concave shaped.

The front end inner wall 314 may be flat, convex shaped or concave shaped. The front end inner wall 314 may be parallel to the front end outer wall 312.

The rear end 340 includes a rear end outer wall 342 separated from a rear end inner wall 344 along the cam central axis 50. The rear end outer wall 342 and/or the rear end inner wall 344 may include beveled, chamfered or curved edges around the outside diameter of rear end 340.

The rear end length $L_R$, measured as the axial distance from the rear end outer wall 342 to the rear end inner wall 344, may be less than, greater than or the same as the front end length LF. The front end length LF may be measured as the axial distance from the front end outer wall 312 to the front end inner wall 314.

The rear end 340 may include a rear recess similar to, or the same as, the front recess 313 extending from the rear end outer wall 342 toward the rear end inner wall 344. The rear recess may be structured and arranged to receive a rotation tool such that rotation of the rotation tool applies a force on the rear end 340, resulting in a rotation of the rear end 340. The rear end 340 may be rotated about the cam central axis 50. The rear recess may be hex shaped, cross shaped, square shaped, star shaped, triangular shaped, line shaped and/or the like. In some non-limiting embodiments or aspects, the rear end outer wall 342 may be flat, convex shaped or concave shaped.

Figure 7:
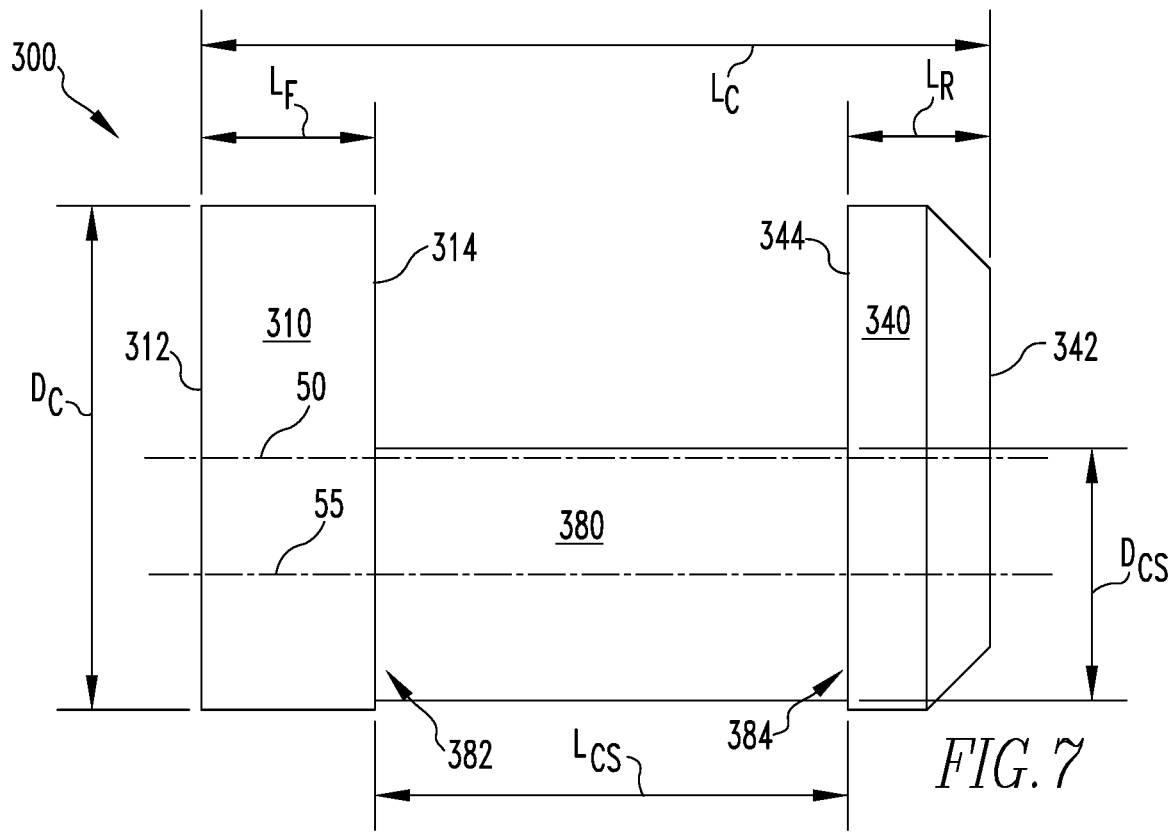
FIG. 7 is a side view of the cam in of FIG. 5.
Figure 8:
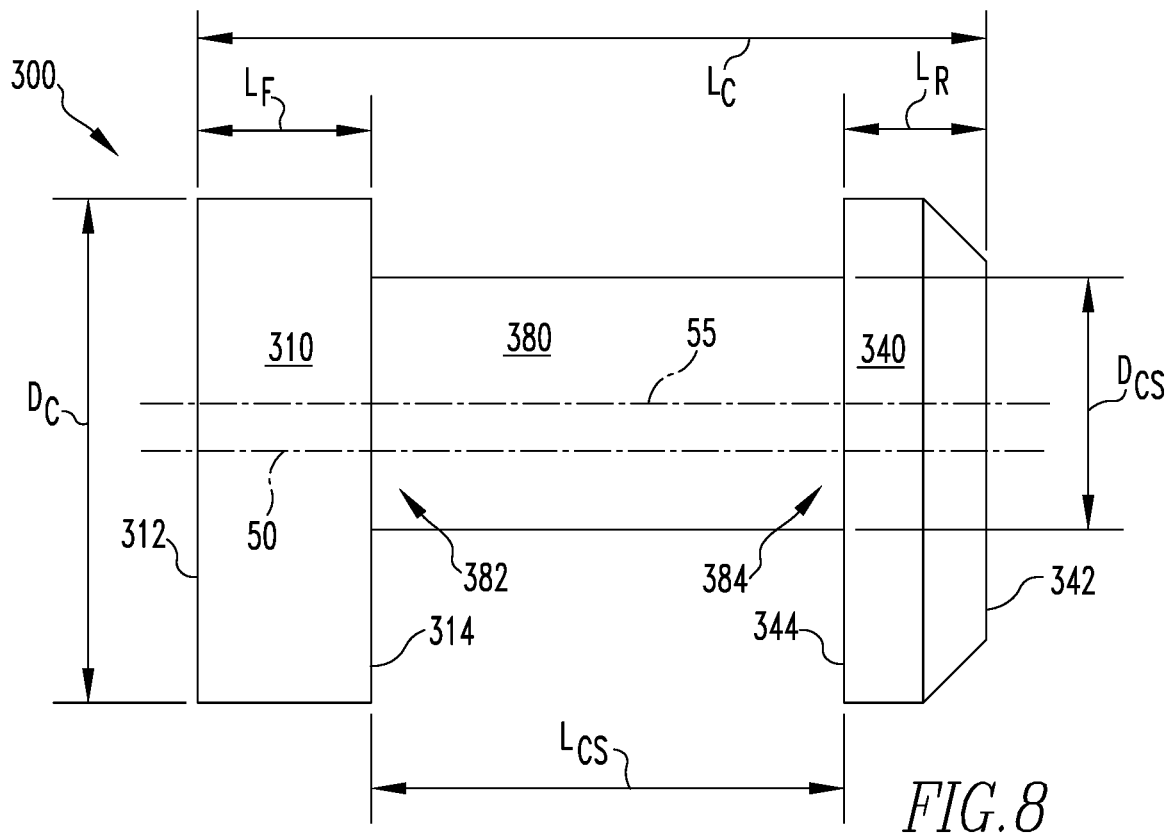
FIG. 8 is another side view of the cam of FIG. 5.

As shown in FIGS. 7 and 8, the front end 310 and rear end 340 may be connected to each other with a cam shaft 380. The cam shaft 380 may be cylindrical in shape. The cam shaft 380 may have a circular cross-section or a non-circular cross section. The cam shaft 380 may extend from a cam shaft front end 382 to a cam shaft back end 384 centered along a shaft axis 55. The cam shaft front end 382 may be adjacent to the front end 310. The cam shaft back end 384 may be adjacent to the rear end 340.

The cam shaft 380 may have a cam shaft diameter $D_{CS}$ that is at least 20 percent of the cam outer diameter $D_C$, for example, at least 30 percent of the cam outer diameter $D_C$, or at least 40 percent of the cam outer diameter $D_C$. The cam shaft diameter $D_{CS}$ may be at most 80 percent of the cam outer diameter $D_C$, for example, at most 70 percent of the cam outer diameter $D_C$, or at most 50 percent of the cam outer diameter $D_C$. The cam shaft diameter $D_{CS}$ may range from 20 percent of the cam outer diameter $D_C$ to 80 percent of the cam outer diameter $D_C$, for example, from 30 percent of the cam outer diameter $D_C$ to 70 percent of the cam outer diameter $D_C$ or from 40 percent of the cam outer diameter $D_C$ to 50 percent of the cam outer diameter $D_C$. The cam shaft diameter $D_{CS}$ may be less than the cam outer diameter $D_C$.

The cam shaft 380 may have a cam shaft length $L_{CS}$ measured as the axial distance between the front end inner wall 314 and the rear end inner wall 344. The cam shaft length $L_{CS}$ may be greater than the locking pin diameter $D_{LP}$.

The cam total length $L_C$ may be equal to the sum of the cam shaft length $L_{CS}$, front end length LF and rear end length $L_R$. The cam total length $L_C$ may be at least equal to the cam outer diameter $D_C$ for example, at least 1.25 times the cam outer diameter $D_C$ or at least 1.5 times the cam outer diameter $D_C$. The cam total length $L_C$ may be at most 3 times the cam outer diameter $D_C$, for example at most 2.5 times the cam outer diameter $D_C$ or at most 2 times the cam outer diameter $D_C$. The cam total length $L_C$ may range from equal to the cam outer diameter $D_C$ to 3 times the cam outer diameter $D_C$, for example, from 1.25 times the cam outer diameter $D_C$ to 2.5 times the cam outer diameter $D_C$ or from 1.5 times the cam outer diameter $D_C$ to 2 times the cam outer diameter $D_C$.

As shown in FIG. 5, the shaft axis 55 may be parallel to the cam central axis 50. The shaft axis 55 may be radially offset from the cam central axis 50. The shaft axis 55 may be radially offset such that the shaft axis 55 is centered at a distance of half of the cam shaft diameter $D_{CS}$ from the outside surface of the cam front end 310 or cam rear end 340. An outside edge of the cam shaft 380 may align with an outside edge of the front end 310 and/or the rear end 340.

The front end 310, rear end 340 and cam shaft 380 may be made of any suitable material, including metals such as steel, or other suitable materials with suitable strength and wear resistance.

Although the front end 310, rear end 340 and cam shaft 380 are shown as being integrally formed in FIGS. 5-8, it should be understood that the components could alternatively be separate components. In some non-limiting embodiments or aspects, the cam shaft 380, front end 310 and rear end 340 may form separate individual components connected to each other through threaded connections, adhesive, friction fits, and/or the like. The individual or integral component may be formed by casting, machining, sintering, additive manufacturing, molding or other method of manufacturing.

The draw pin 150 may be secured by the clamping cam 300 into the tool shank 200. The cam shaft 380 may interact with the draw pin notch 156 to secure the draw pin 150 into the draw pin slot 220. The cam shaft 380 may interact with the draw pin notch 156 through rotation of the clamping cam 300. The clamping cam 300 may be rotated in a clockwise or counterclockwise direction around the cam central axis 50. The clamping cam 300 may be rotated through interaction of a rotation tool with the front recess 313. The clamping cam 300 may be rotated in a first direction to lock the draw pin 150 in place. As illustrated in FIGS. 11A-11D, the first direction may be the counterclockwise direction. The clamping cam 300 may be rotated in a second direction opposite the first direction to release the draw pin 150.

Figure 11A:
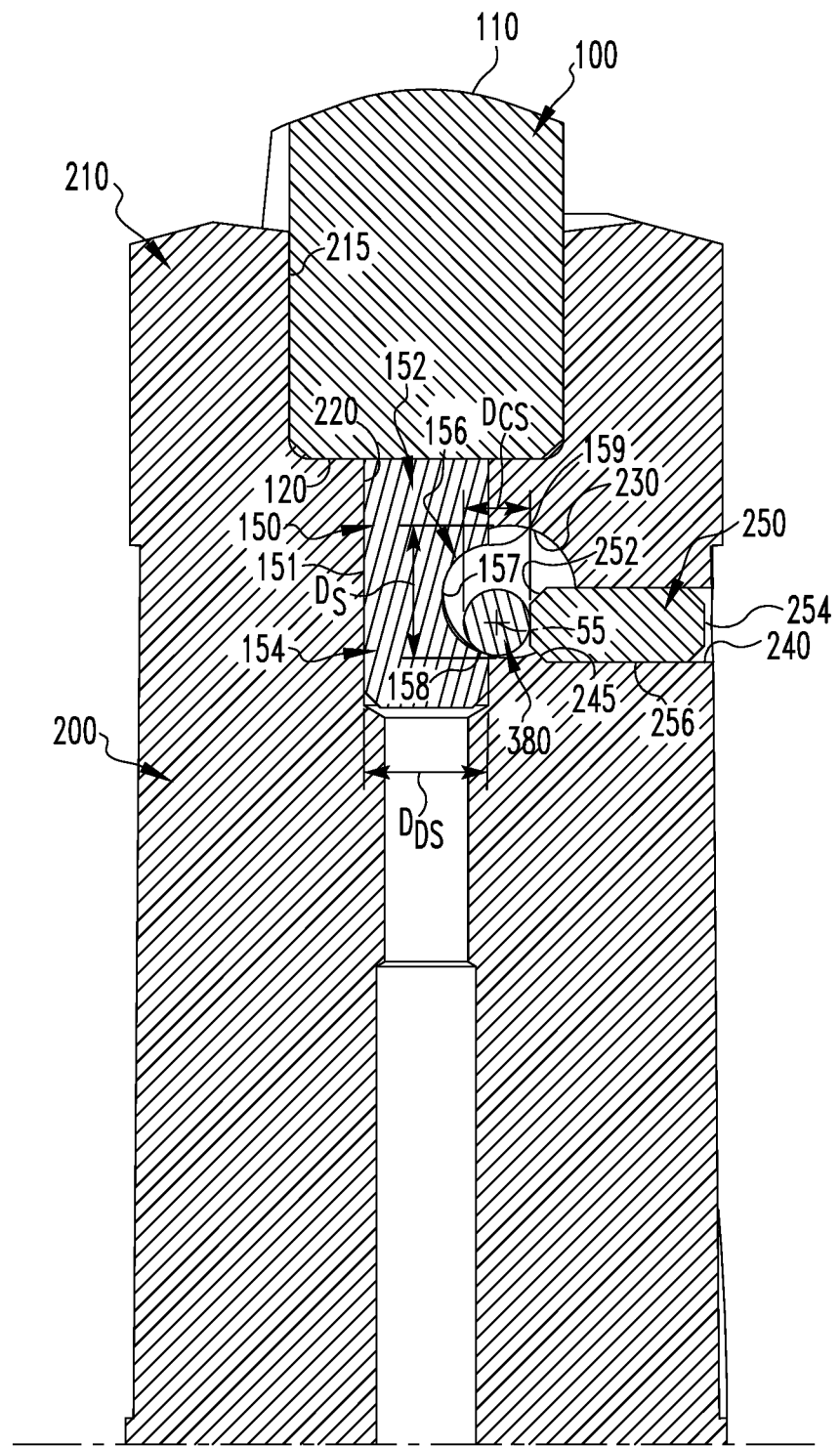
FIG. 11A is a side sectional view of the modular drill of FIG. 1 in a clamped position taken through section 11A-11A of FIG. 4.

FIG. 11A shows the clamped position of the clamping cam 300 and cutting head 100. In the clamped position, the cutting head 100 is fully inserted into the tool shank 200. The cam shaft 380 is in contact with the clamping cam follower contact surface 158. The edge of the draw pin notch 156 closest to the draw pin second end 154 may align with the cam slot 230. The cam shaft 380 may also be in contact with the locking pin front surface 252. The locking pin front surface 252 may prevent further rotation in the first direction of the clamping cam 300. The cam shaft 380 prevents movement of the draw pin 150 along the rotational axis 40 toward the shank top end 210. The draw pin 150 may be prevented from moving in a direction along the rotational axis 40 toward the shank bottom end 260 by the cutting head bottom surface 120 coming in contact with the cutting head slot 215.

Figure 11B:
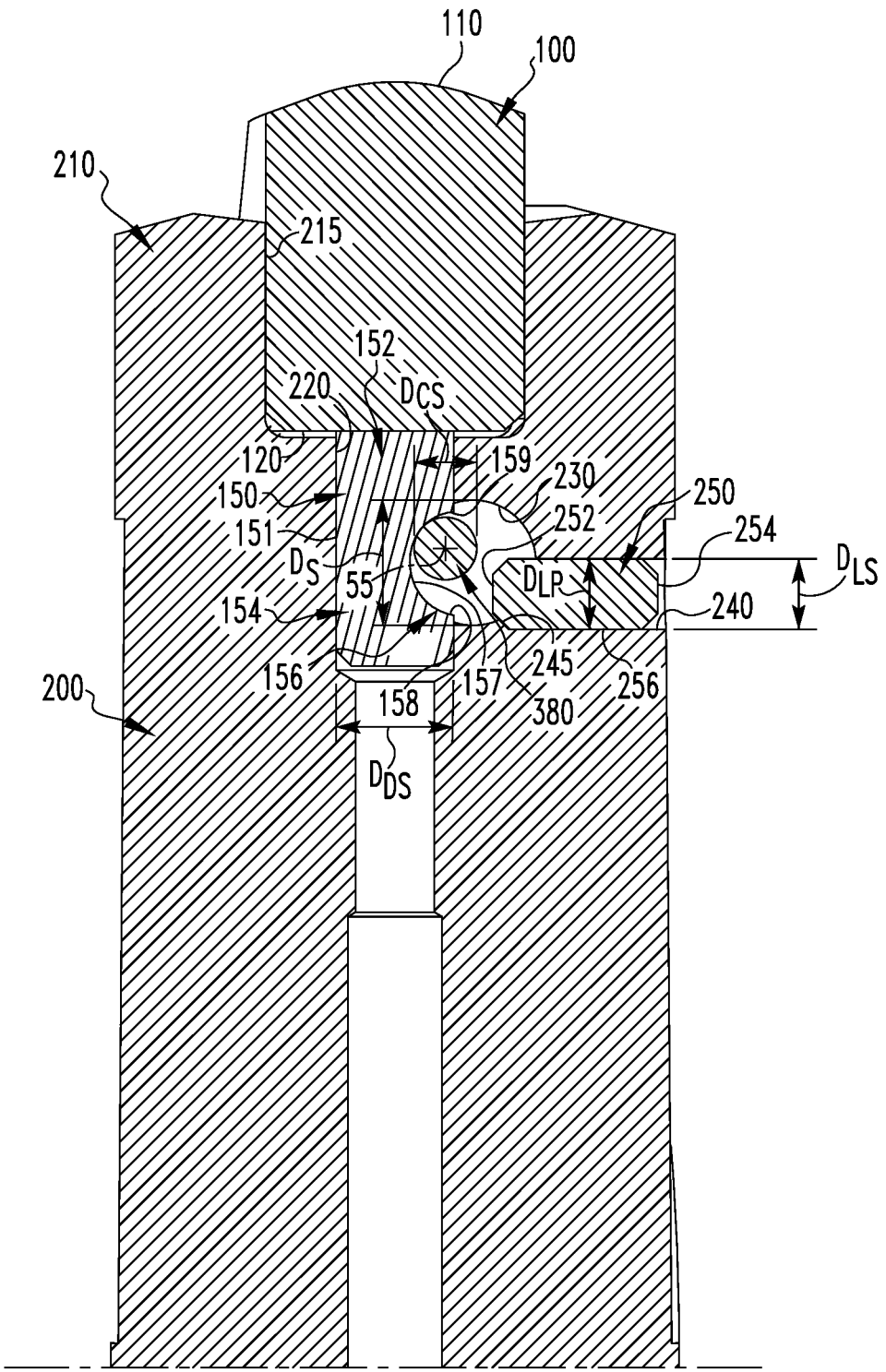
FIG. 11B is a side sectional view of the modular drill of FIG. 1 in a transitional position.

FIG. 11B shows the clamping cam 300 and cutting head 100 in a transitional position. The transitional position is achieved by rotating the clamping cam 300 in the second direction from the clamped position. As shown in FIG. 11B, the second direction may be the clockwise direction. In the transitional position, the cam shaft 380 may be in contact with the intermediate surface 157. The draw pin notch 156 may be structured and arranged to allow full rotation of the cam shaft 380 within the cam slot 230. The cam shaft 380 may maintain contact with the draw pin notch 156 during the entire rotation of the clamping cam 300. For example, when the cam shaft 380 is rotated into a position that is closest to the rotational axis 40, the cam shaft 380 may still be in contact with the draw pin notch 156. In some non-limiting embodiments, the cam shaft 380 may not come in contact with the intermediate surface 157 during rotation of the clamping cam 300 between the discharge position and the clamped position. The cam shaft 380 begins to apply a force on the discharging cam follower contact surface 159 with a force component parallel to the rotational axis 40 directed toward the shank top end 210 as the clamping cam 300 is rotated in the second direction. The force from the cam shaft 380 begins to push the draw pin 150 along the rotational axis 40 out of the draw pin slot 220. The cam shaft 380 may follow the curve of the discharging cam follower contact surface 159 during rotation until the clamping cam 300 is in the discharge position.

Figure 11C:
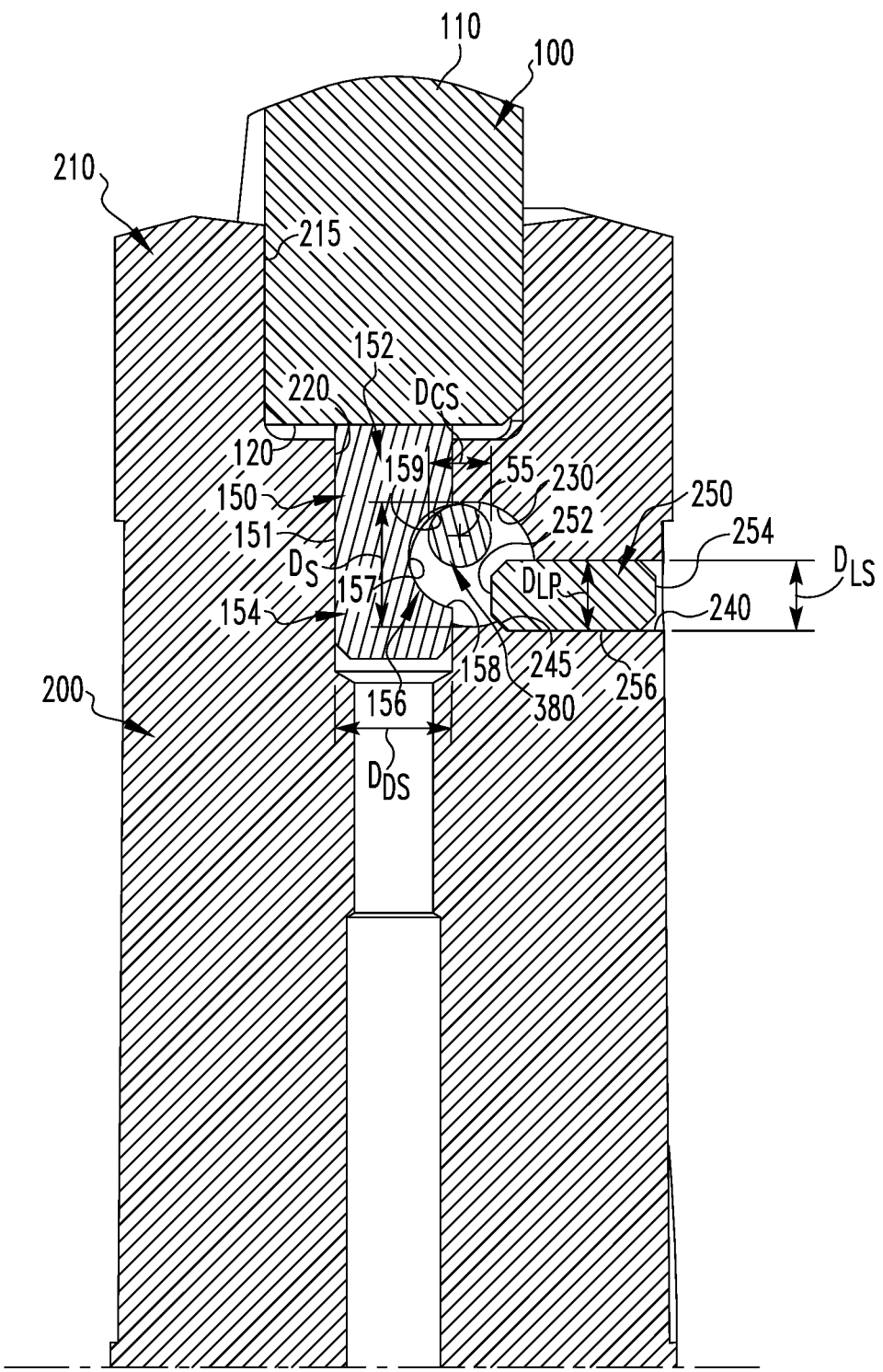
FIG. 11C is a side sectional view of the modular drill of FIG. 1 in a discharge position.

FIG. 11C shows the clamping cam 300 and cutting head 100 in a discharge position. The discharge position is achieved by rotating the clamping cam 300 in the second direction from the transitional position. At this discharge position, the cam shaft 380 is located at the position where the surface of the draw pin notch 156 aligns with the cam slot 230 closest to the shank top end 210. At the discharge position, the cam shaft 380 is no longer applying a force on the draw pin notch 156. The draw pin 150 has been shifted by the force of the cam shaft 380 in the outward direction of the draw pin slot 220.

Figure 11D:
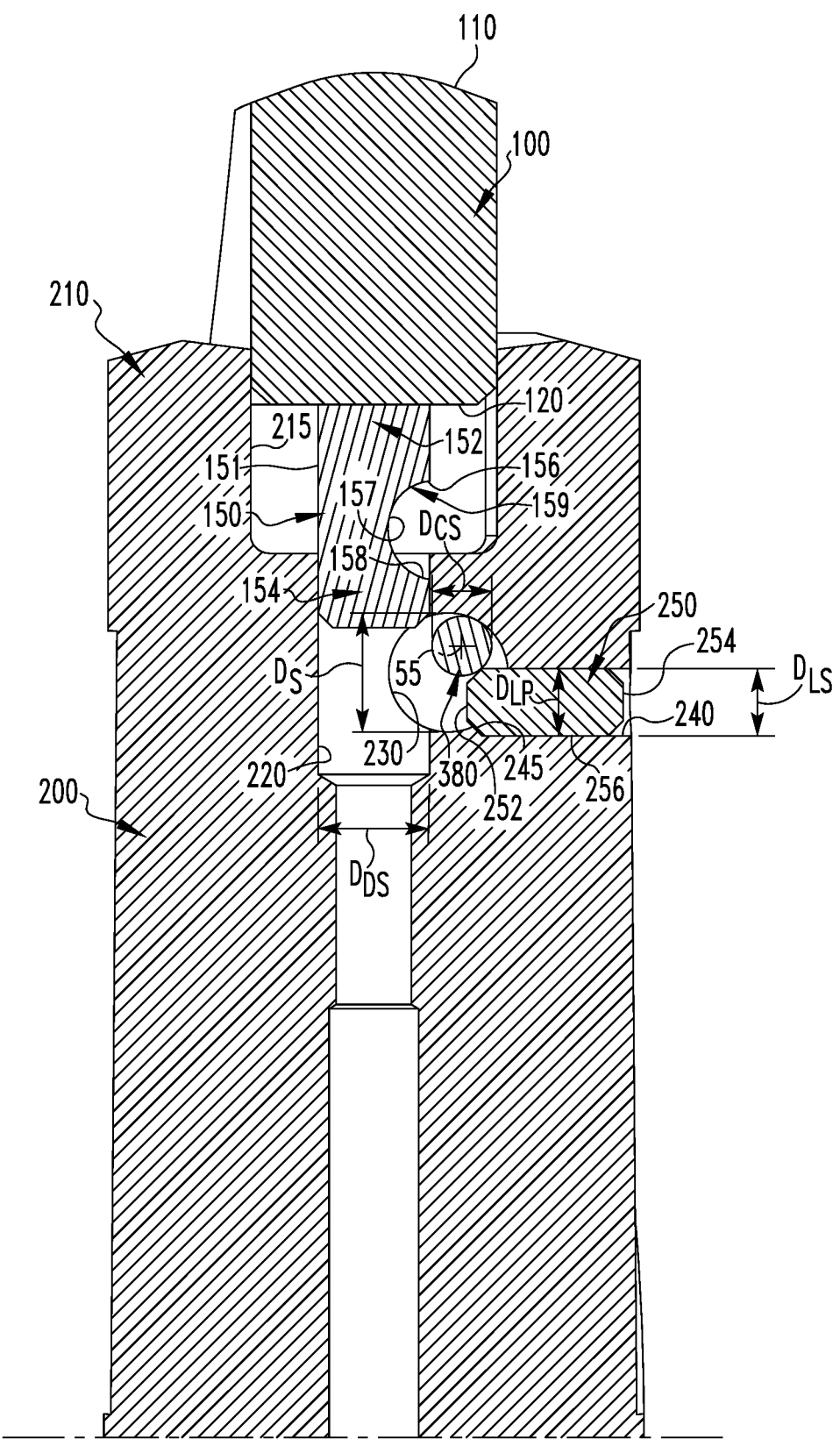
FIG. 11D is a side sectional view of the modular drill of FIG. 1 in an unlocked position

FIG. 11D shows the clamping cam 300 and cutting head 100 in an unlocked position. In the unlocked position, the clamping cam 300 is rotated in the second direction until the cam shaft 380 no longer intersects with the draw pin slot 220. The cam shaft 380 also does not intersect with the draw pin notch 156. The cam shaft 380 may be prevented from rotating further in the second direction by the locking pin front surface 252 and/or the locking pin outside surface 256. The locking pin 250 may prevent full circular rotation of the cam shaft 380 around the cam central axis 50. The draw pin 150 may be able to slide out of, or into, the draw pin slot 220 without contacting the cam shaft 380. The draw pin 150 removal may be made easier by the discharge force applied to the draw pin 150 by the cam shaft 380 during the transition to the discharge position from the clamped position. The discharge force may weaken the friction fit between the cutting head 100 and the cutting head slot 215, requiring less force to fully remove the cutting head 100 from the tool shank 200.

When the clamping cam 300 is rotated in the first direction from the unlocked position to the clamped position, the draw pin 150 is pulled farther into the tool shank 200 by the cam shaft 380. During the transition of the cam shaft 380 from the unlocked position to the clamped position, the force applied by the cam shaft 380 during the rotation of the clamping cam 300 will pull the draw pin 150 fully into the draw pin slot 220. The cam shaft 380 will follow the curve of the clamping cam follower contact surface 158 during the rotation of the clamping cam 300. The cam shaft 380 may be in contact with the draw pin notch 156 during the entire rotation of the clamping cam 300 to the clamped position, or the cam shaft 380 may only make contact with the clamping cam follower contact surface 158. As the cam shaft 380 follows the curve of the draw pin notch 156, the cam shaft 380 applies a force to the clamping cam follower contact surface 158, pulling the draw pin 150 along the rotational axis 40 toward the shank bottom end 260.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A modular drill comprising:
    a tool shank extending along a rotational axis comprising a shank first end and a shank second end along the rotational axis and comprising a cam slot extending at least partially through a width of the tool shank;
    a cutting head extending from a cutting head first surface to a cutting head second surface centered on the rotational axis, wherein the cutting head comprises:
        a draw pin extending from the cutting head second surface along the rotational axis; and
        a draw pin notch; and
    a clamping cam comprising a cam shaft structured and arranged to contact the draw pin notch, wherein the clamping cam further comprises:
        a first end extending along a cam central axis from a first end outer wall to a first end inner wall;
        a second end opposite the first end extending along the cam central axis from a second end inner wall to a second end outer wall; and
    the cam shaft connecting the first end inner wall to the second end inner wall, wherein the cam shaft extends from the first end inner wall to the second end inner wall along a cam shaft axis, wherein the cam shaft axis is parallel to and offset from the cam central axis.

2. The modular drill of claim 1, wherein the cam shaft axis is centered a distance of half of an outer diameter of the cam shaft from an outer diameter of the first end.

3. The modular drill of claim 1, wherein at least one of the first end outer wall and the second end outer wall comprise a recess structured and arranged to receive a rotation tool.

4. The modular drill of claim 1, wherein an outer diameter of the cam shaft is at most 50 percent of an outer diameter of the first end.

5. The modular drill of claim 1, wherein the cam slot at least partially intersects with a draw pin slot containing the draw pin centered on the rotational axis.

6. The modular drill of claim 5, wherein the central axis is offset from the rotational axis.

7. The modular drill of claim 5, wherein the tool shank further comprises a locking slot comprising a locking pin, wherein at least a portion of the locking slot intersects with the cam slot.

8. The modular drill of claim 7, wherein the locking slot lies in a plane perpendicular to the rotational axis.

9. The modular drill of claim 7, wherein at least a portion of the locking pin extends into the cam slot.

10. The modular drill of claim 9, wherein the locking pin prevents complete circular rotation of the cam shaft.

11. The modular drill of claim 9, wherein the locking slot comprises a pin stop engaging the locking pin preventing further insertion into the locking slot.

12. The modular drill of claim 5, wherein the draw pin notch intersects with the cam slot when the clamping cam is in a clamped position.

13. The modular drill of claim 12, wherein the cam shaft contacts the draw pin notch when the clamping cam is in the clamped position.

14. The modular drill of claim 5, wherein the cam shaft does not intersect with the draw pin notch when the clamping cam is in an unlocked position.

* * * * *